United States Patent [19]
Abe et al.

[11] Patent Number: 5,789,902
[45] Date of Patent: Aug. 4, 1998

[54] BI-DIRECTION CURRENT CONTROL CIRCUIT FOR MONITORING CHARGE/ DISCHARGE OF A BATTERY

[75] Inventors: Noboru Abe; Kohei Ito, both of Fukaya, Japan

[73] Assignees: Hitachi Metals, Ltd., Tokyo; Hitachi Maxell, Ltd., Osaka, both of Japan

[21] Appl. No.: 804,056

[22] Filed: Feb. 21, 1997

[30] Foreign Application Priority Data

Feb. 22, 1996 [JP] Japan ................... 8-034774
Feb. 22, 1996 [JP] Japan ................... 8-034775

[51] Int. Cl.⁶ ............................................ H01M 10/46
[52] U.S. Cl. .................................. 320/134; 320/136
[58] Field of Search ............................. 320/116, 121, 320/124, 125, 132, 134, 136, 148, 161, 162, DIG. 18, DIG. 19, DIG. 21, 104, 120, 129, 138, 147

[56] References Cited

U.S. PATENT DOCUMENTS 5,304,915  4/1994  Sanpei et al. ................. 320/116
5,547,775  8/1996  Eguchi et al. ................. 320/118
5,554,919  9/1996  Uchida ......................... 320/132
5,570,004  10/1996 Shibata ........................ 323/303

*Primary Examiner*—Edward Tso
*Attorney, Agent, or Firm*—Finnegan, Henderson, Farabow, Garrett & Dunner

[57] ABSTRACT

A battery-monitoring circuit includes a bidirectionally current-controllable means disposed between a secondary battery and a charging circuit or a load circuit for monitoring the charge or discharge of the secondary battery to prevent undesirable charging. The current control means has characteristics as an active diode, which is constituted by an error amplifier to which a predetermined voltage and voltage between both terminals of the current control means are supplied. The current control means supplies an output to the current-controllable means, such that the output of the current-controllable means is controlled constant, equal to the predetermined voltage.

11 Claims, 6 Drawing Sheets

BI-DIRECTION CURRENT CONTROL CIRCUIT FOR MONITORING CHARGE/DISCHARGE OF A BATTERY

BACKGROUND OF THE INVENTION

The present invention relates to a battery-monitoring circuit assembled in portable electronic appliances such as video cameras, notebook-type personal computers, etc., and more particularly to a battery-monitoring circuit suitable for secondary batteries such as lithium ion batteries which would become dangerous if overcharged.

Lithium ion batteries capable of storing a large amount of energy per volume have been developed as rechargeable secondary batteries for use as power supplies in various portable electronic appliances. Though the lithium ion batteries exhibit excellent performance, they need battery-monitoring circuits having control characteristics suitable for the charge-discharge characteristics of secondary batteries, because their terminal voltage should be monitored and controlled during charging and discharging more closely than conventional secondary batteries. For instance, if the lithium ion batteries are inadvertently overcharged or overdischarged, not only is their life is extremely shortened, but also they cannot perform 100%. Further, since the lithium ion batteries contain an inflammable electrolyte, the lithium ion batteries are likely to inflame or cause a burn to users when overcharged. Accordingly, battery chargers are equipped with protection devices for preventing overcharge. Nevertheless, considering incidents which may occur if the lithium ion batteries are charged by unsuited chargers or if the protection devices function insufficiently, it is a general practice that the lithium ion batteries themselves are also equipped with battery-monitoring circuits for redundant protection.

FIG. 5 is a block diagram showing a conventional battery-monitoring circuit combined with a secondary battery. A battery 1 is connected to each of a load circuit 2 and a charging circuit 3 in parallel. In the structure shown in FIG. 5, there is a switch means 7 constituted by transistors, etc. between the load terminal 4 and a terminal 6 of the battery 1. This switch means 7 carries out an ON-OFF control based on the results of comparison of a battery voltage with a reference voltage of a reference voltage-generating circuit 8. When the terminal voltage of the battery 1 is irregularly deviated from the predetermined level in this circuit structure, the switch means 7 is operated to shut the connection of the battery 1 from the charging circuit 3 or the load circuit 2 for the prevention or avoidance of irregular states.

In the case of a lithium ion battery equipped with the conventional battery-monitoring circuit, a limit voltage is set for overcharge or overdischarge as follows: When the lithium ion battery starts to be charged by a charging circuit 3, voltage at the terminal 6 of the battery 1 starts to increase according to the charging characteristics of the battery 1. When the voltage of the battery 1 reaches a predetermined overcharge voltage, for instance, 4.2 V after a certain period of time, the output level of a comparator circuit 9 changes to turn off the switch means 7, thereby stopping the charging of the battery 1. Even the slightest excess of a battery voltage over the predetermined level would possibly cause serious incidents. At the time of discharging, on the other hand, a predetermined overdischarge voltage is set, for instance, at 2.3 V, shutting the load circuit 2 when detecting this predetermined voltage, likewise in the case of charging.

Next, a basic operation of the conventional battery-monitoring circuit for a secondary battery will specifically be explained referring to FIG. 7. In the circuit structure of FIG. 7, the switch means 7 shown in FIG. 5 is constituted by field effect transistors (FETs) 71 and 72 connected in inverse series, and the comparator circuit 9 is constituted by comparators 91, 92. During charging, the charging circuit 3 is connected to the battery 1 with the FET 72 ON. During discharging, on the other hand, the load circuit 2 is connected to the battery 1 with the FET 71 ON, thereby discharging electric energy from the battery 1 to the load circuit 2. Since lengthy explanation is needed for all of the operation mode of the battery-monitoring circuit, focus is placed on operations at the time of overcharge or overdischarge.

First, with respect to protection against the overcharge, voltage obtained by dividing the terminal voltage of the battery 1 by resistors 21, 22 is supplied to an inverting input of the comparator 92, while a reference voltage $V_{ref}$ of a reference voltage-generating circuit constituted by a resistor 23 and a voltage-regulating diode 81 is supplied to a non-inverting input of the comparator 92. The voltage division ratio and the reference voltage $V_{ref}$ are determined such that the voltage obtained by dividing the battery terminal voltage by the resistors 21, 22 becomes equal to the reference voltage $V_{ref}$ when the above battery voltage reaches the predetermined overcharge voltage. When the terminal voltage of the battery 1 reaches the predetermined overcharge voltage or more, one of inputs of the comparator 92 becomes lower than the other (terminal voltage of the resistor 21 becomes higher than $V_{ref}$). This makes the output of the comparator 92 HIGH, thereby turning the FET 72 off because the output of the comparator 92 is connected to a gate of the FET 72. As a result, the battery 1 is shut off from the charging circuit 3 to prevent the overcharge.

An actual battery voltage is lower than the charged voltage because of an internal resistance Ri of the battery 1 during charging. When the FET 72 is turned off, current is prevented from flowing into the battery 1, thereby reducing the terminal voltage of the battery 1 to a battery voltage level before the turn-off. Accordingly, the output of the comparator 92 returns from HIGH to LOW, thereby turning on the FET 72 again to resume the charging. As a result, the terminal voltage of the battery 1 exceeds the predetermined overcharge voltage again, making the output of the comparator 92 HIGH. Thus, after the completion of charging, the turn-on and off of the FET 72 is repeated. To avoid this, the comparator 92 is usually provided with hysteresis characteristics, whereby the FET 72 is kept OFF until the terminal voltage of the battery 1 becomes sufficiently lower than the predetermined overcharge voltage once overcharged. A range between the turn-off of the FET 72 by overcharge and the subsequent turn-on of the FET 72 because of sufficient decrease in the terminal voltage of the battery 1 is called "overcharged state." The above relations are shown in FIG. 8, in which $V_{hh}$ represents the voltage at which the FET 72 is turned off, and $V_{hl}$ represents the voltage at which the FET 72 is turned on.

In the case of preventing the overdischarge, voltage obtained by dividing the terminal voltage of the battery 1 by resistors 34, 35 is compared with $V_{ref}$ in a comparator 91 to control the turn-on and off of the FET 71. The comparator 91 is usually provided with hysteresis characteristics like the comparator 92.

Though the switch means is constituted by P-type MOSFETs in FIG. 7, it may also be constituted by N-type MOSFETs and disposed on the side of a common terminal 5.

In the case of using MOSFETs for the FETs 71, 72, it is known that there are parasitic diodes 71a, 72a in parallel with the FETs 71, 72. When the load circuit is connected for discharge during the turn-on of the FET 72 in an overcharged state, the parasitic diode 72a in parallel with the FET 72 is forwardly biased. Therefore, it is possible to supply current from the battery 1 to the load circuit 2 even if the FET 72 is turned off. Of course, when the terminal voltage of the battery 1 is sufficiently lower than the predetermined overcharge voltage over the hysteresis of the comparator 92, discharge can be carried out through the FET 72 because the FET 72 is in an ON state.

Even if the FET 71 is turned off because of an overdischarged state, the parasitic diode 71a connected in parallel to the FET 71 is forwardly biased when the charging circuit 3 is connected. Therefore, it is possible to supply current from the charging circuit 3 to the battery 1 through the parasitic diode 71a for the purpose of charging. When the terminal voltage of the battery 1 is sufficiently higher than the predetermined overdischarge voltage over the hysteresis of the comparator 91, charging can be carried out through the FET 72 because the FET 72 is ON.

Recently, portable equipments such as cellular phones, personal computers, portable audio equipments, video cameras, etc. have become widespread, and strong demand exists to miniaturize these portable equipments and to reduce their energy consumption. For these purposes, it is not only natural to improve the performance of batteries themselves, but it is also important to reduce the loss of battery-monitoring circuits. Further, in the case of lithium ion batteries, there is a safety problem that they are likely to suffer from overheating or explosion when overcharged. Also, once their terminal voltage lowers to 2.3 V or less by overdischarge, they generally fail to return to the original voltage level by recharging. Accordingly, they should be protected not only from overcharge but also from overdischarge. However, since a tolerance range of voltage set for these protections is extremely narrow, circuit structures necessary for achieving such protections are inevitably extremely complicated.

In one example of the conventional structures shown in FIG. 7 in which individual FETs are turned on or off for the control of charging or discharging as described above, charging or discharging current flows through parasitic diodes connected in parallel to the FETs which are in an OFF state in both of discharging in an overcharged state and charging in an overdischarged state.

Since the forward voltage drop through a parasitic diode is generally about 0.8 V, an internal loss occurs in the parasitic diode in either of charging and discharging. In the case of using a lithium ion battery as a battery 1, the voltage generated by one cell is about 3.6 V. Therefore, this forward voltage drop of about 0.8 V is as large as about 25% of the cell voltage, meaning that a loss by the parasitic diode is not negligible. Also, since the loss by the parasitic diode appears as heat, it was necessary to use FETs having unnecessarily large current capacity.

If it is possible to control two FETs 71, 72 connected in inverse series by detecting which of the charging circuit and the load circuit is connected to the terminal 4, an internal loss of a parasitic diode connected in parallel to each FET can drastically be reduced. However, it has been difficult to achieve such a structure for the reasons described below.

As the surest means for determining which of the load circuit 2 and the charging circuit 3 is connected to the load terminal 4, the inventors have considered that the detection of voltage difference between both terminals of the switch means 7 may be effective. This is shown in FIG. 6 which is the same as FIG. 5 except for a comparator 11 inputting voltage from both terminals of the current-controlling means or circuit 7. When the voltage of the battery terminal 6 is higher than the voltage of the load terminal 4, the comparator 11 determines that the load circuit 2 is connected to the load terminal 4. On the other hand, when the voltage of the battery terminal 6 is lower than the voltage of the load terminal 4, the comparator 11 determines that the charging circuit 3 is connected to the load terminal 4. This circuit is exemplified in FIG. 7, in which there is a voltage-detecting comparator means between the battery terminal 6 and the load terminal 4.

When the voltage of the battery terminal 6 is higher than the voltage of the load terminal 4, the FET 72 is turned on by determining that the load circuit 2 is connected to the load terminal 4, despite the fact that the output of the comparator 92 tends to turn off the FET 72 in an overcharged state. As a result, since discharge current flows through the FET 72 having a small ON resistance, it is expected to drastically reduce the loss caused by the parallel-connected parasitic diode. A specific circuit for such a purpose may be a logic circuit connected to the gate of the FET 72, in which the output of the comparator 91 to which the voltage of the load terminal 4 is supplied is connected to the output of the comparator 92 to which the voltage of the battery terminal 6 is supplied.

In the case of an overdischarged state, the loss caused by the parallel-connected parasitic diode 71a can be reduced by turning the FET 71 on when the voltage of the terminal 6 is lower than the voltage of the terminal 4, though detailed explanation thereof is omitted here.

However, it is practically very difficult to compare precisely the voltage of the battery terminal 6 and the voltage of the load terminal 4. It is well known that a usual comparator circuit usable for the comparison of the above voltages has an offset voltage, including noises, which can be considerable, amounting up to about 100 mV. Accordingly, as long as the comparator circuit is used, circuit design should be made taking into consideration this offset voltage. For instance, to prevent the charging in an overcharged state, the setting of the comparator circuit may be deviated in advance taking into consideration the offset voltage, such that it may be determined that the load circuit 2 is connected to the load terminal 4 when the voltage of the battery terminal 6 is higher than the voltage of the load terminal 4 by more than the maximum value (for instance, 100 mV) of the offset voltage. In this case, assuming that the two FETs have an ON resistance of about 100 mΩ, a voltage drop by the FETs is 100 mV or less when as small current as 1 A or less is supplied to the load circuit 2. As a result, the comparator circuit determines that the load circuit 2 is not connected to the load terminal 4, failing to achieve the desired objective.

Also, this method has failed to provide stable operating characteristics because of the following phenomenon. Once the FET 72 is turned on due to the fact that the voltage of the load terminal 4 is lower than the voltage of the battery terminal 6, the forward voltage drop through the FET becomes so small that the difference in voltage between the terminal 6 and the terminal 4 becomes smaller than the above predetermined voltage. As a result, the comparator circuit determines that not the load circuit 2 but the charging circuit 3 is connected to the load terminal 4, thereby returning the FET 72 from ON to OFF. The voltage of the terminal 4 drops in the next step, and the comparator circuit determines again that the load circuit is connected, leading to the turn-on of the FET 72. Thus, a positive feedback loop is formed in the conventional circuit, resulting in oscillation which makes the operation of the battery-monitoring circuit unstable.

In the case of charging in an overdischarged state, the same operation can be performed as is known from the above description, though current flows in an opposite direction. Therefore, detailed explanations thereof will be omitted here.

OBJECT AND SUMMARY OF THE INVENTION

As a result of research to solve the above problems of the conventional circuits, the inventors have achieved the battery-monitoring circuit of the present invention suitable for secondary batteries, etc. which can not only save energy in both charging and discharging but also be stably operated.

The battery-monitoring circuit of the present invention comprises a current control means capable of bidirectionally controlling current disposed between a secondary battery and a charging circuit or a load circuit to monitor the charge or discharge of the secondary battery to prevent undesirable charging. Voltage between both terminals of the current control means is detected and controlled to be kept constant. The current control means has characteristics as an active diode, which may be constituted by an error amplifier to which a predetermined voltage and voltage between both terminals of the current control means are input.

In the present invention, the difference in voltage (simply called "voltage difference") between both terminals of a current-controlling means disposed between a battery and a charging circuit or a load circuit is detected to determine which of the load circuit and the charging circuit is connected. The current-controlling means has an analog switching function with impedance variable substantially continuously between ON and OFF instead of a digital switching function operable only ON and OFF. The voltage difference between both terminals of the current-controlling means is detected for feedback control thereof by utilizing the characteristic that the impedance of the current-controlling means varies substantially continuously in a relatively low voltage range. The current-controlling means also has characteristics of preventing current from flowing in an opposite direction.

DETAILED DESCRIPTION OF THE PREFERRED EMBODIMENTS

Figure 1:
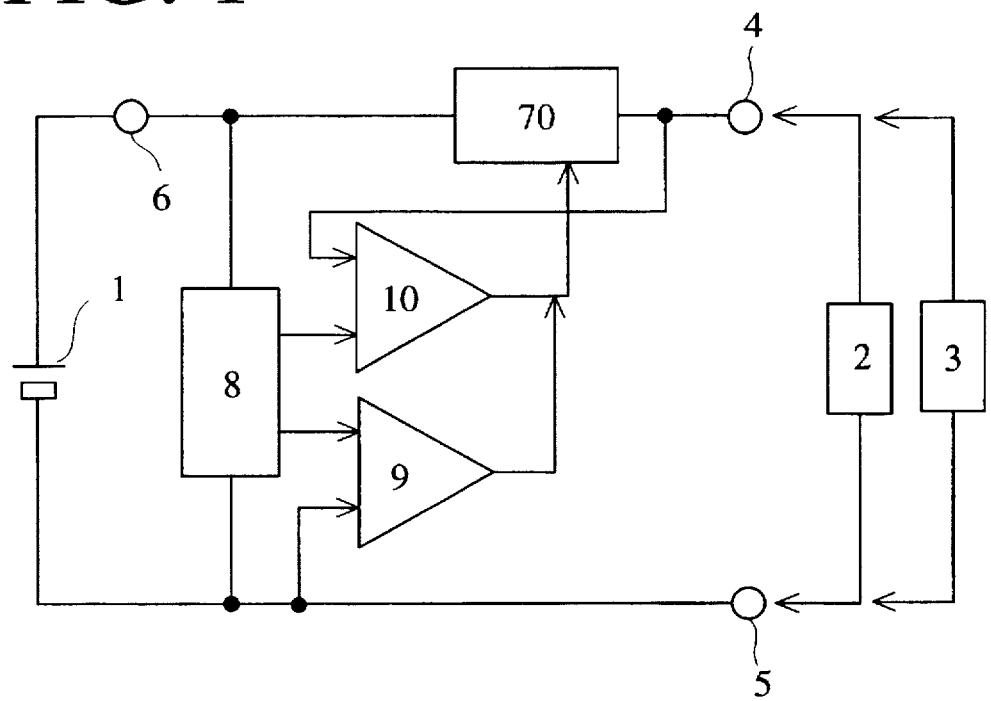
FIG. 1 is a circuit block diagram showing the principle of the present invention.
Figure 5:
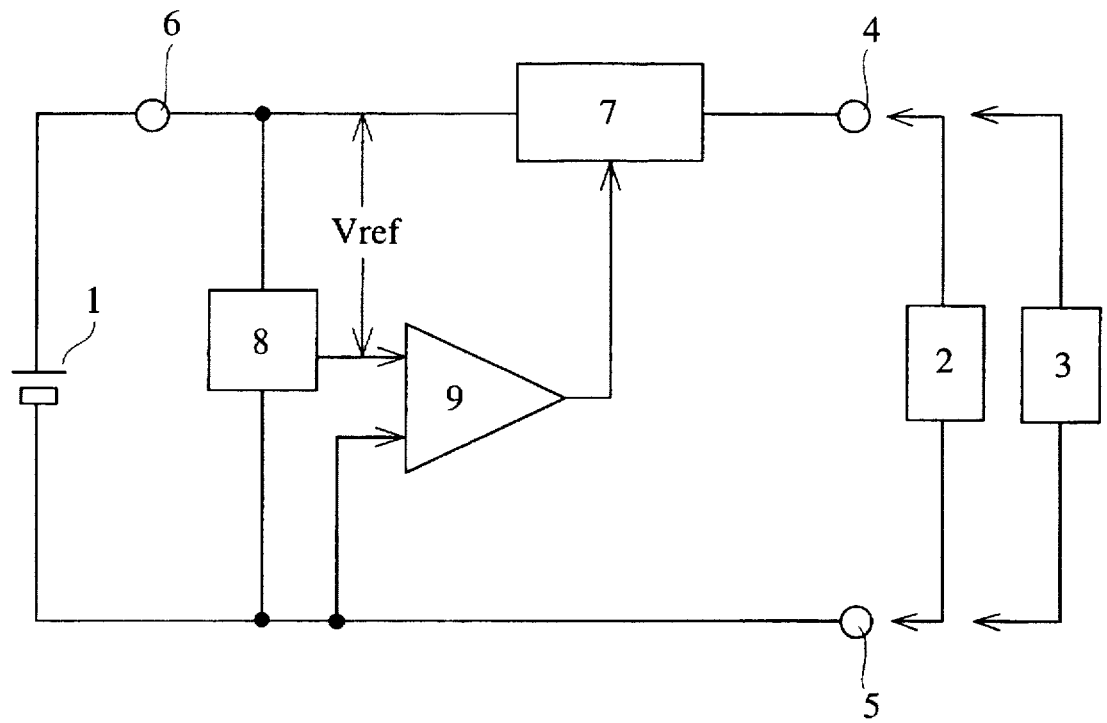
FIG. 5 is a circuit block diagram showing a conventional circuit.
Figure 8:
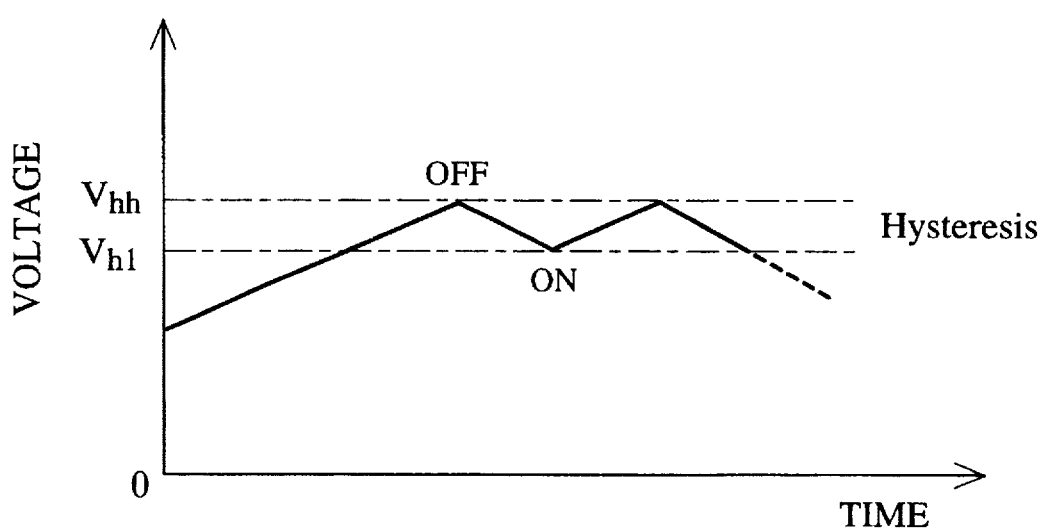
FIG. 8 is a graph showing the characteristic operation of a comparator circuit in the conventional circuit.
Figure 6:
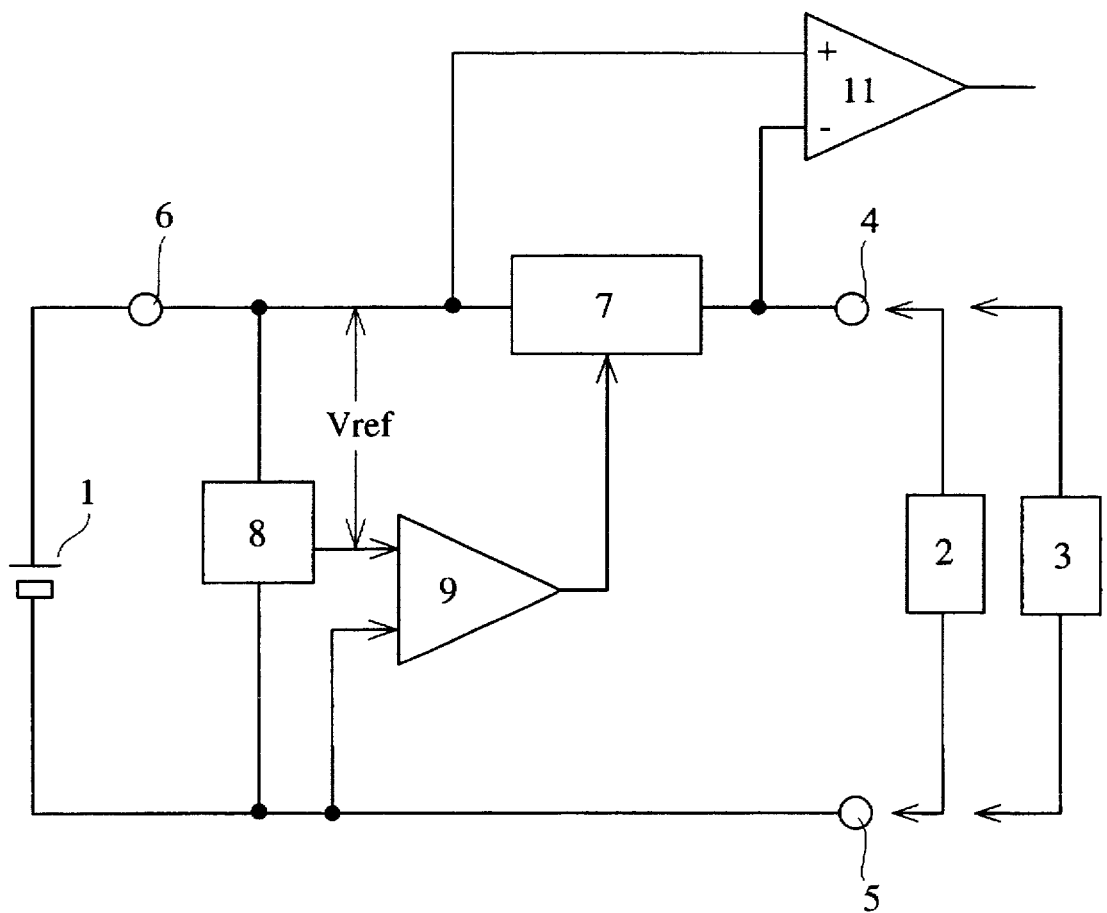
FIG. 6 is a circuit block diagram showing the same circuit as that shown in FIG. 5 except for a comparator inputting voltage from both terminals of the current-controlling means.
Figure 7:
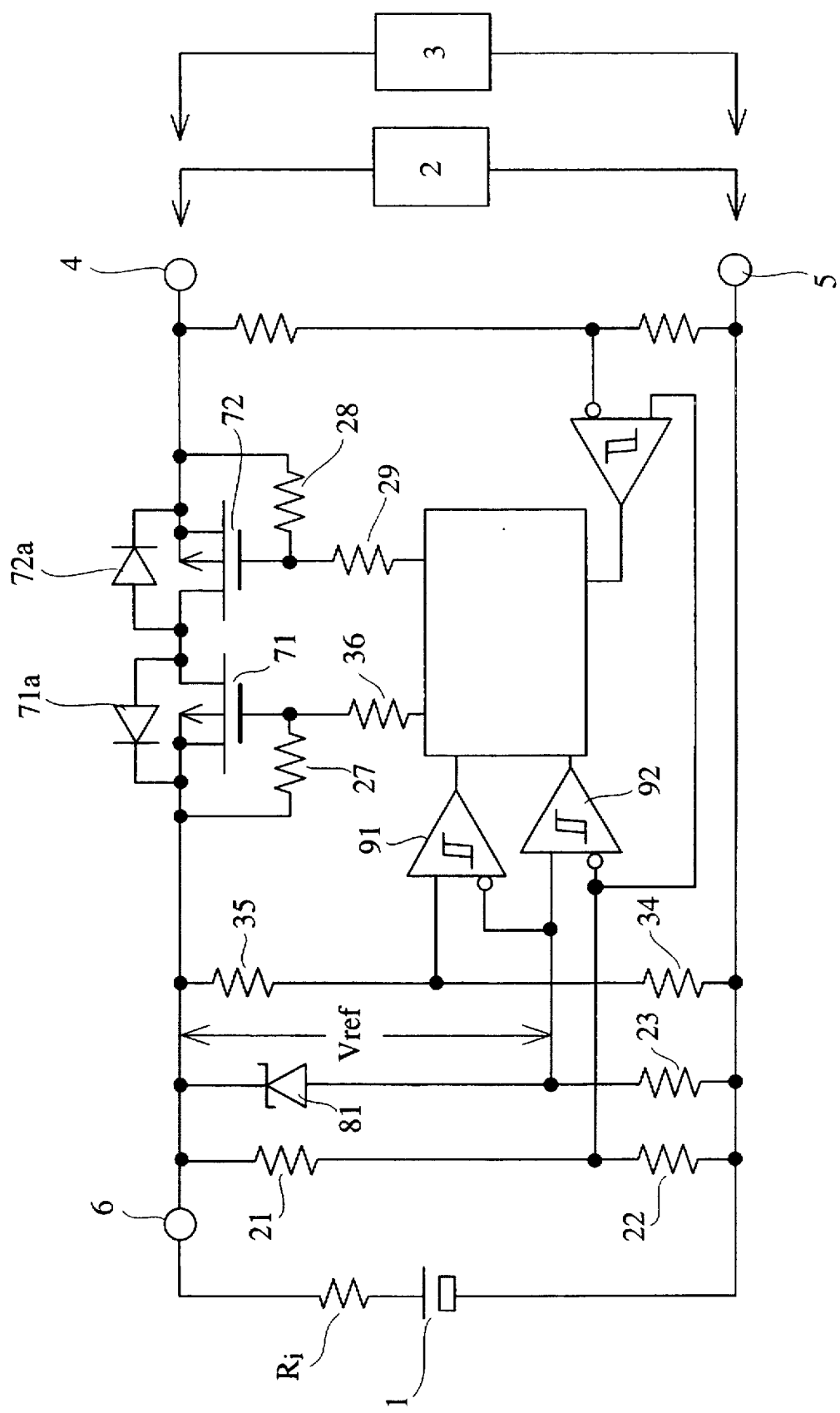
FIG. 7 is a schematic view showing the circuit of the conventional circuit of FIG. 5.

The battery-monitoring circuit of the present invention may be shown by a block diagram of FIG. 1. In FIG. 1, elements having the same functions as those in FIGS. 5 and 6 are assigned the same reference numerals. The battery-monitoring circuit according to one embodiment of the present invention comprises:

(a) a reference voltage-generating circuit connected to both terminals of a secondary battery;

(b) a current-controlling means having impedance variable substantially continuously between ON and OFF and connected between the secondary battery and a terminal to which a load circuit or a charging circuit is connected; and (c) an error-amplifying circuit receiving the output of the current-controlling means as a first input, and a predetermined voltage from the reference voltage-generating circuit as a second input, to supply an output to the current-controlling means such that the output of said error-amplifying circuit varies the impedance of the current-controlling means.

The battery-monitoring circuit may further have a comparator circuit receiving a battery terminal voltage as a first input, a predetermined voltage from the reference voltage-generating circuit as a second input, to supply an output to the current-controlling means.

What makes the battery-monitoring circuit of the present invention distinguishable from the conventional circuit is, as is apparent from FIG. 1, that the voltage difference between both terminals of the current-controlling means or circuit 70 is amplified by an error-amplifying circuit 10 whose output is supplied to the current-controlling means 70. The battery-monitoring circuit of the present invention having such a closed loop has the following characteristics. The output of the error-amplifying circuit 10 carries out the feedback control of the output of the current-controlling means 70 by varying the impedance of the current-controlling means 70, such that the voltage between both terminals of the current control means 70 becomes constant, equal to the predetermined voltage level ($V_1$ in FIG. 2). As a result, the operation of the current-controlling means is close to the ideal diode characteristics, making it possible to operate the current-controlling means at a considerably lower voltage than the forward voltage drop of a PN-junction of a diode even though there are limitations such as noise of the error-amplifying circuit, etc. Thus, it is clear that the loss of the parasitic diode, which has been a problem of the conventional circuit, can be alleviated.

To solve the above problems of the conventional circuit, the battery-monitoring circuit of the present invention is characterized in that the current-controlling means has an impedance changing continuously or at an extremely small step width from a low state to a high state instead of a simple ON-OFF binary control function. Such a current-controlling means may comprise a transistor, preferably a FET having a small ON resistance. An analog switch without parasitic diodes connected in parallel to the FETs may also be used. Though a bipolar transistor does not decrease the loss because the forward voltage drop of the bipolar transistor does not largely differ from that of a diode, it is possible to prevent an inverse current with the bipolar transistor in the circuit structure of the present invention.

Figure 2:
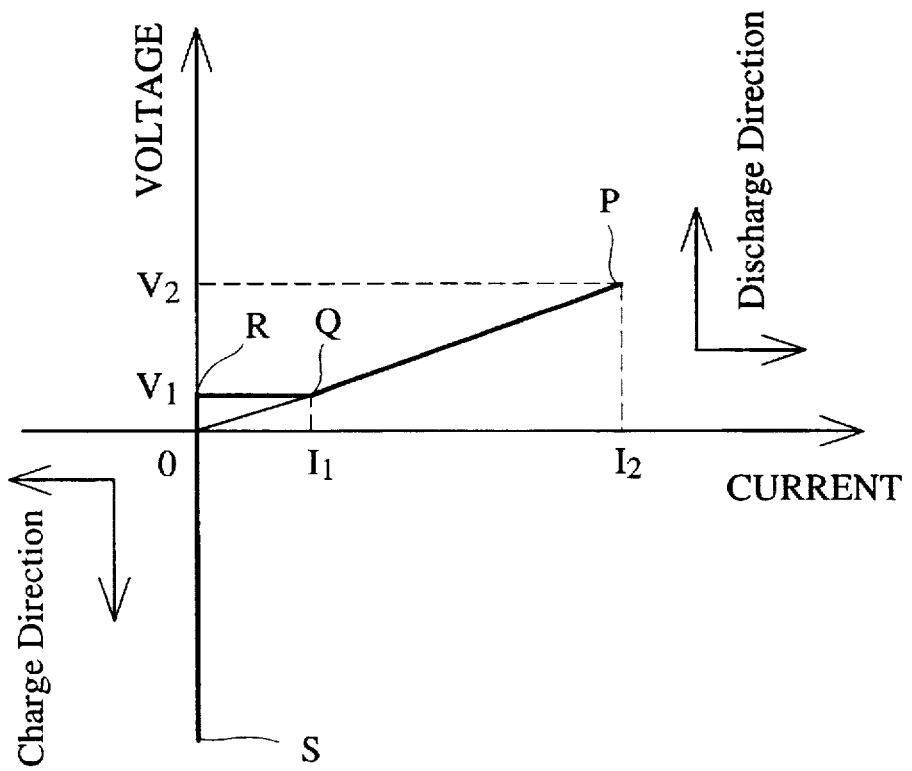
FIG. 2 is a graph showing the characteristic operation of the battery-monitoring circuit according to the present invention.

One example of the voltage-current characteristics between both terminals of the current-controlling means in an overcharged state is shown in FIG. 2. In an overdischarged state, on the other hand, the voltage-current characteristics between both terminals of the current-controlling means of the present invention are centrosymmetrical to those in the overcharged state with respect to the origin O in FIG. 2.

In a region in which voltage between both terminals of the current-controlling means is low, the voltage difference between the battery terminal 6 and the load terminal 4 is controlled to be constant at $V_1$ as shown by a line Q-R in FIG. 2 by controlling by the error-amplifying circuit 10 to the same voltage as the reference voltage $V_{ref}$. Even if the current is caused to increase tending to increase the voltage between both terminals of the current-controlling means 70 in this state, a feedback control takes place by the signal of the error-amplifying circuit 10 to reduce the impedance of the current-controlling means 70, resulting in keeping voltage between both terminals of the current-controlling means 70 constant. When the current increases over $I_1$, the impedance of the current-controlling means 70 reaches the minimum level without further decrease, thereby providing a constant ON resistance. Thus, linear characteristics can be obtained as shown by a line Q-P in FIG. 2. On the other hand, when the current nears 0, the impedance of the current-controlling means 70 increases, and the current-controlling means 70 is turned off when the current reaches 0. Even if the current is caused to flow in an opposite direction, the OFF state of the current-controlling means 70 is maintained because its impedance further increases. This state is shown from R to S in FIG. 2.

The voltage-current characteristics of a conventional switch means in an ON state are substantially linear with a gradient determined by the ON resistance, like the characteristics obtained by extending the line P-Q. In an OFF state, on the other hand, since no current flows even if the voltage changes, it shows such characteristics as obtained by extending the line O-S. It is well understood that in the case of switching operation taking into consideration the above noise and offset voltage, discharge cannot be carried out or a charging current may not be prevented in a current range lower than $I_1$. Keeping the noise and the drift voltage, for instance, at about 0.1 mV or less would be extremely difficult, even if low-noise, low-drift amplifiers, etc. are employed. That is, if the ON resistance is 100 mΩ, a charging current of 1 mA can be supplied to the battery for a long period of time after the overcharge, resulting in the likelihood of serious incidents such as explosion, etc.

The value of $V_1$ is determined by $V_{ref}$ in the present invention, but it is necessary to determine $V_1$ by taking into consideration the noise and offset voltage on the same level as that of the above comparator circuit. For instance, if $V_{ref}=100$ mV, it is clear from FIG. 2 that $V_1$ is sufficiently higher than the noise and offset voltage, preventing the opposite flow of current, and enabling discharge even at current of lower than $I_1$. The lower the actual $V_1$, the smaller the loss of the current-controlling means. However, even in the case of using low-noise, low-drift amplifiers, etc., the actual lower limit of $V_1$ is about 0.1 mV at best, and further decreasing $V_1$ would be an unrealistic approach. On the other hand, if the maximum value of $V_1$ is higher than about 0.8 V which is equivalent to the value of the forward voltage drop of the parasitic diodes connected in parallel to the MOSFETs, the full advantages of the present invention cannot be obtained. In the range of $V_1$ from 0.1 mV to 0.8 V, remarkable effects can be obtained.

Figure 3:
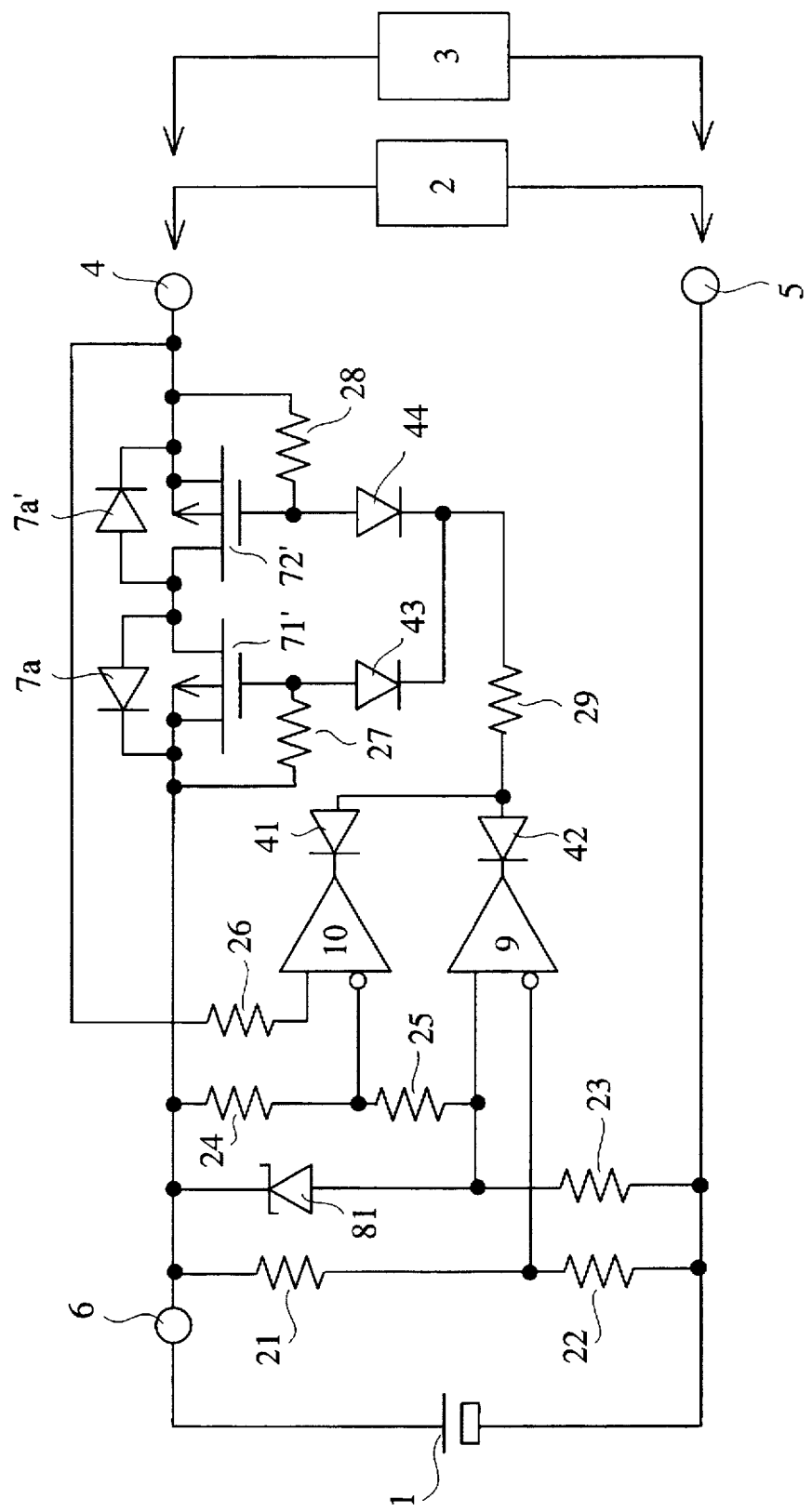
FIG. 3 is a schematic view showing the battery-monitoring circuit according to one embodiment of the present invention.

One example of the battery-monitoring circuit of the present invention is shown in FIG. 3. Explanations about similar elements in FIG. 3 to those described above will be omitted here if redundant. The battery 1 is connected to the load circuit 2 or the charging circuit 3 via a current-controlling means comprising MOSFETs 71', 72' connected in inverse series. Both of the charging circuit 3 and the load circuit 2 may be connected in parallel, or either of them may individually be connected in FIG. 3. The predetermined voltage referring to the voltage of the battery terminal 6 is supplied to the inverting input terminal of the error amplifier 10, while the load terminal 4 is connected to the non-inverting input terminal of the error amplifier 10 via a resistor 26. Though FIG. 3 shows a reference voltage-generating circuit constituted by the resistor 23 and the voltage-regulating diode 81, the reference voltage-generating circuit having good temperature characteristics is preferably a band gap-type reference voltage-generating circuit widely used for ICs with a reference voltage-generating circuit, typically shunt regulators, etc. The output of the error-amplifying circuit 10 is connected to the output of an overcharge-detecting comparator circuit 9 via diodes 41 and 42. Further, the output of the error-amplifying circuit 10 is connected to the gates of MOSFETs 71', 72' to control the output of the MOSFETs 71', 72' simultaneously. The control of the MOSFETs by the error-amplifying circuit 10 is an analog control, while the control of the MOSFETs by the overcharge-detecting comparator circuit 9 is ON-OFF switching. When the output of the overcharge-detecting comparator circuit 9 is HIGH in an overcharged state, the discharge current to the load circuit and voltage between both terminals of the current-controlling means 70 are controlled as shown in FIG. 2.

Also, when the voltage of the battery 1 is lower than the overvoltage (the output of the overcharge-detecting comparator circuit 9 is LOW), the MOSFETs 71', 72' are ON without depending on the operation of the error-amplifying circuit 10.

In the above embodiment, the predetermined voltage $V_1$ is set at 50 mV, and it would be difficult to maintain a stable operation if this predetermined voltage $V_1$ is less than 100 μV. Also, if this predetermined voltage is higher than 0.8 V, the effects of the present invention would not be achieved because the predetermined voltage $V_1$ does not differ from the forward loss of the above parasitic diode.

Figure 4:
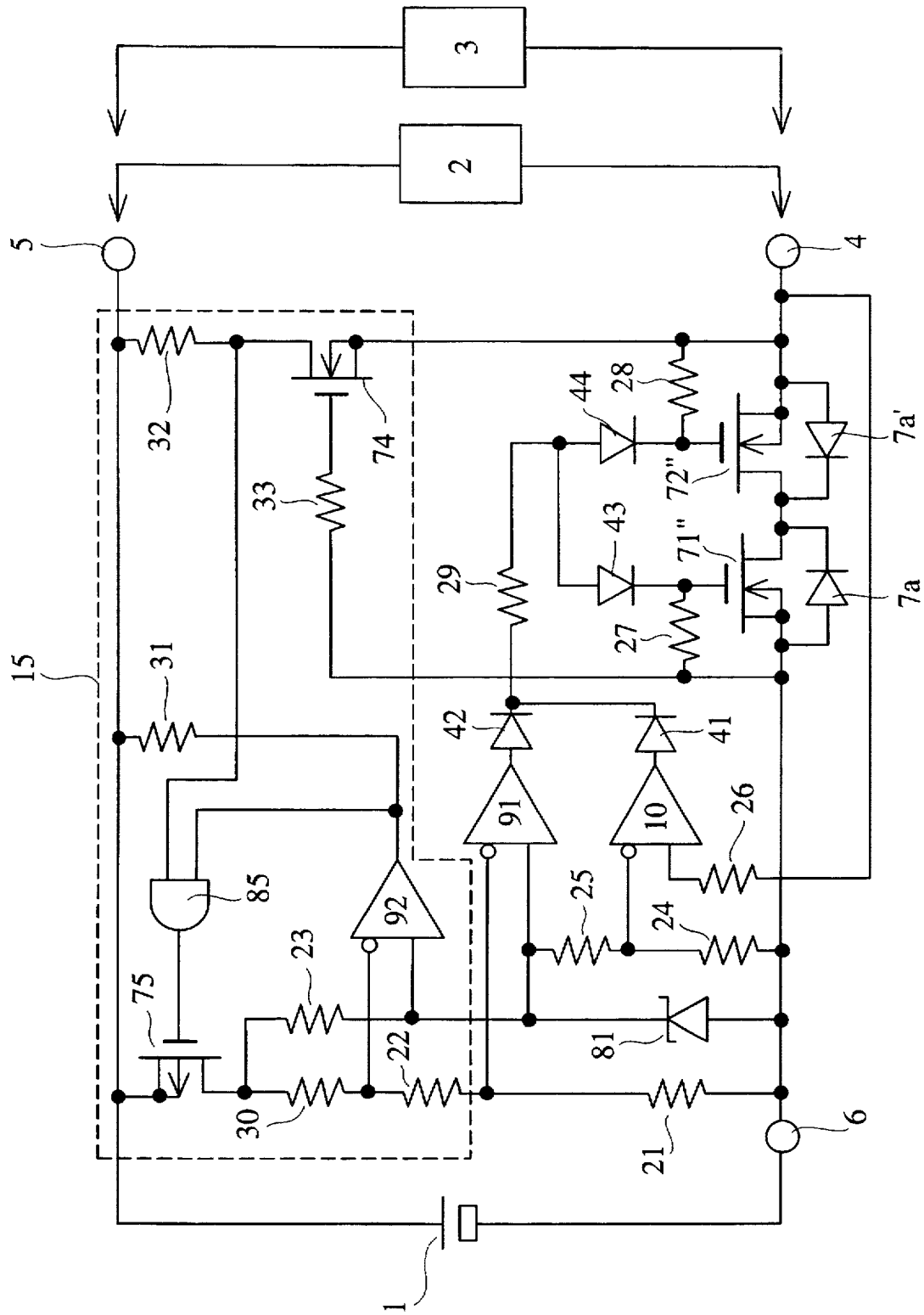
FIG. 4 is a schematic view showing the battery-monitoring circuit according to another embodiment of the present invention.

Though FIG. 3 shows the inverse-series connection of the P-channel MOSFETs 71', 72' to the plus sides of the load circuit 2 and the charging circuit 3, the N-channel MOSFETs 71", 72" may also be connected in inverse series to the minus sides of the load circuit 2 and the charging circuit 3 in another embodiment shown in FIG. 4. Explanations about similar elements in FIG. 4 to those described above will be omitted here if redundant. The circuit shown in FIG. 4 comprises a sleep circuit 15 which reduces current consumption in an overdischarge state.

The protection from overdischarge in FIG. 4 will be explained below. In FIG. 4, the voltage of the battery 1 is divided by resistors 30, 22 and 21. The ON resistance of the FET 75 is sufficiently lower than the resistors 30, 22 and 21. Voltage at a connection of the resistors 30 and 22 is compared with a reference voltage at a connection of the resistor 23 and the voltage-regulating diode 81 by the comparator circuit 92. When the voltage of the battery 1 is within a normal range, the output of the comparator circuit 92 is LOW because the divided voltage is higher than the reference voltage. Also, since one input of an AND circuit 85 is LOW regardless of whether the transistor 74 is ON or OFF, the output of the AND circuit 85 is LOW, thereby turning on the transistor 75.

When it is determined that there is an overdischarge because the voltage of the battery 1 is lower than the predetermined overdischarge voltage, the output of the comparator circuit 92 is HIGH because the divided voltage is lower than the reference voltage. At this time, if the current direction is toward the load, the transistor 74 is OFF. As a result, both inputs of the AND circuit 85 are HIGH, making the output of the AND circuit 85 HIGH thereby turning off the transistor 75. When the transistor 75 is turned off, other circuit elements than the AND circuit 85, the resistors 31, 32 and 33 and the transistor 74 are kept at the voltage of the battery terminal 6, simultaneously stopping the supply of current to unnecessary circuit elements. At this time, since both inputs of the AND circuit 85 are made HIGH by the resistors 31 and 32, the transistor 75 is kept OFF.

The return of the transistor 74 from OFF to ON depends on the charging conditions. Since the MOSFETs 71", 72" are OFF, the voltage which is a difference between the voltage of the terminal 5 and the voltage of the battery 1 is applied between the gate and the source of the transistor 74 at the same time as applying the charging voltage, turning on the transistor 74. Since the turn-on of the transistor 74 makes one input of the AND circuit 85 LOW, the output of the AND circuit 85 becomes LOW, thereby turning on the transistor 75. As a result, current is supplied to all circuit elements to start the normal operation. In this state, the operation of the error-amplifying circuit 10 prevents discharge by the same principle as that of the error amplifier 10 shown in FIG. 3. Therefore, their detailed explanation will be omitted here.

As described above in detail, the present invention provides a battery-monitoring circuit capable of determining a charging state or a discharging state. By controlling bidirectionally controllable semiconductor elements (for instance, those constituted by field effect transistors connected in inverse series but operable as a single semiconductor element), the battery can be protected from overcharge and overdischarge.

Further, the loss of the MOSFETs, etc. can be minimized and voltage can be stably applied to the load even at a minimal current load as shown by the voltage-current characteristics in FIG. 2, ensuring the protection of the battery from overcharge even at the time of charging at minimal current. Also, the battery-monitoring circuit of the present invention can protect the secondary battery from overdischarge.

What is claimed is:

1. A battery-monitoring circuit comprising a current control means disposed between a secondary battery and a charging circuit or a load circuit for monitoring the charge or discharge of said secondary battery to prevent undesirable charging, said current control means being capable of controlling current in both charging and discharging, and voltage between both terminals of said current control means being detected and controlled to be kept constant, whereby the charge or discharge of said secondary battery is carried out while avoiding overcharge or overdischarge.

2. The battery-monitoring circuit according to claim 1, wherein voltage between both terminals of said current control means has forward voltage drop characteristics lower than a PN-junction of a diode.

3. The battery-monitoring circuit according to claim 2, wherein voltage between both terminals of said current control means has a first region in which said voltage is constant, and a second region in which said voltage changes substantially proportionally to current.

4. The battery-monitoring circuit according to claim 1, wherein said current control means has an impedance, at least part of which changes substantially continuously.

5. The battery-monitoring circuit according to claim 3, wherein said current control means is controlled by an output of an error-amplifying circuit, and the output of said current control means and an output of a reference voltage-generating circuit are input to said error-amplifying circuit.

6. The battery-monitoring circuit according to claim 4, wherein said current control means is controlled by an output of an error-amplifying circuit, and the output of said current control means and an output of a reference voltage-generating, circuit are input to said error-amplifying circuit.

7. The battery-monitoring circuit according to claim 5, wherein an input of said error-amplifying circuit is set such that voltage between both terminals of said current-controlling means is controlled between 0.1 mV and 800 mV.

8. The battery-monitoring circuit according to claim 6, wherein an input of said error-amplifying circuit is set such that voltage between both terminals of said current-controlling means is controlled between 0.1 mV and 800 mV.

9. The battery-monitoring circuit according to claim 4, wherein said current-controlling means is constituted by field effect transistors connected in inverse series.

10. The battery-monitoring circuit according to claim 5, wherein said current-controlling means is constituted by field effect transistors connected in inverse series.

11. The battery-monitoring circuit according to claim 7, wherein said current-controlling means is constituted by field effect transistors connected in inverse series.

* * * * *